United States Patent
Yu

(10) Patent No.: US 9,752,751 B2
(45) Date of Patent: Sep. 5, 2017

(54) OPTICAL LENS

(71) Applicant: GRANDLITE INTERNATIONAL CORP, City of Industry, CA (US)

(72) Inventor: Chung-Han Yu, City of Industry, CA (US)

(73) Assignee: GRANDLITE INTERNATIONAL CORP, City of Industry, CA (US)

( * ) Notice: Subject to any disclaimer, the term of this patent is extended or adjusted under 35 U.S.C. 154(b) by 180 days.

(21) Appl. No.: 14/851,287

(22) Filed: Sep. 11, 2015

(65) Prior Publication Data

US 2017/0074483 A1    Mar. 16, 2017

(51) Int. Cl.
| | |
|---|---|
| *G02B 3/02* | (2006.01) |
| *F21V 5/04* | (2006.01) |
| *F21V 5/08* | (2006.01) |
| *G02B 3/00* | (2006.01) |
| *F21W 111/02* | (2006.01) |
| *F21Y 115/10* | (2016.01) |

(52) U.S. Cl.
CPC ............... *F21V 5/045* (2013.01); *F21V 5/08* (2013.01); *G02B 3/00* (2013.01); *F21W 2111/02* (2013.01); *F21Y 2115/10* (2016.08)

(58) Field of Classification Search
CPC .. G02B 3/0068; G02B 3/0075; G02B 5/0221; G02B 6/0038; G02B 6/0053; G02B 6/0061; G02B 6/0021; G02B 6/0051; G02B 19/0047; G02B 19/0066; G02F 1/133603; G02F 1/133615; G02F 1/133606; G02F 1/133604; G02F 1/1336; G02F 2001/133607

USPC .......... 349/62; 359/648–651, 707, 708, 720, 359/737; 362/311.02, 311.06–311.1, 362/335–338

See application file for complete search history.

(56) References Cited

U.S. PATENT DOCUMENTS

| | | | |
|---|---|---|---|
| 8,434,912 B2* | 5/2013 | Holder | F21K 9/00 362/245 |
| 9,052,086 B2* | 6/2015 | Broughton | F21V 5/04 |
| 2007/0063210 A1* | 3/2007 | Chiu | G02B 6/0025 257/98 |

* cited by examiner

*Primary Examiner* — Mahidere Sahle
(74) *Attorney, Agent, or Firm* — Amin, Turocy & Watson LLP

(57) ABSTRACT

An optical lens includes a first lens body having a first light exiting surface, a second light exiting surface, a first light incident surface, a second light incident surface, a third light incident surface, and a bottom surface connected to the light incident surfaces; a second lens body having an outer circumference surface, a first inner circumference surface, and an uneven second inner circumference surface; and a mounting body surrounding and connected to the first and second lens bodies, and extending outward with respect to the first and second lens bodies. The first, second and third light incident surfaces are sequentially connected to form on the bottom surface a groove for receiving a light emitting unit. The optical lens has a horizontal beam angle equal to 171.6 degrees ±10% and a vertical beam angle equal to 160 degrees ±10%.

18 Claims, 14 Drawing Sheets

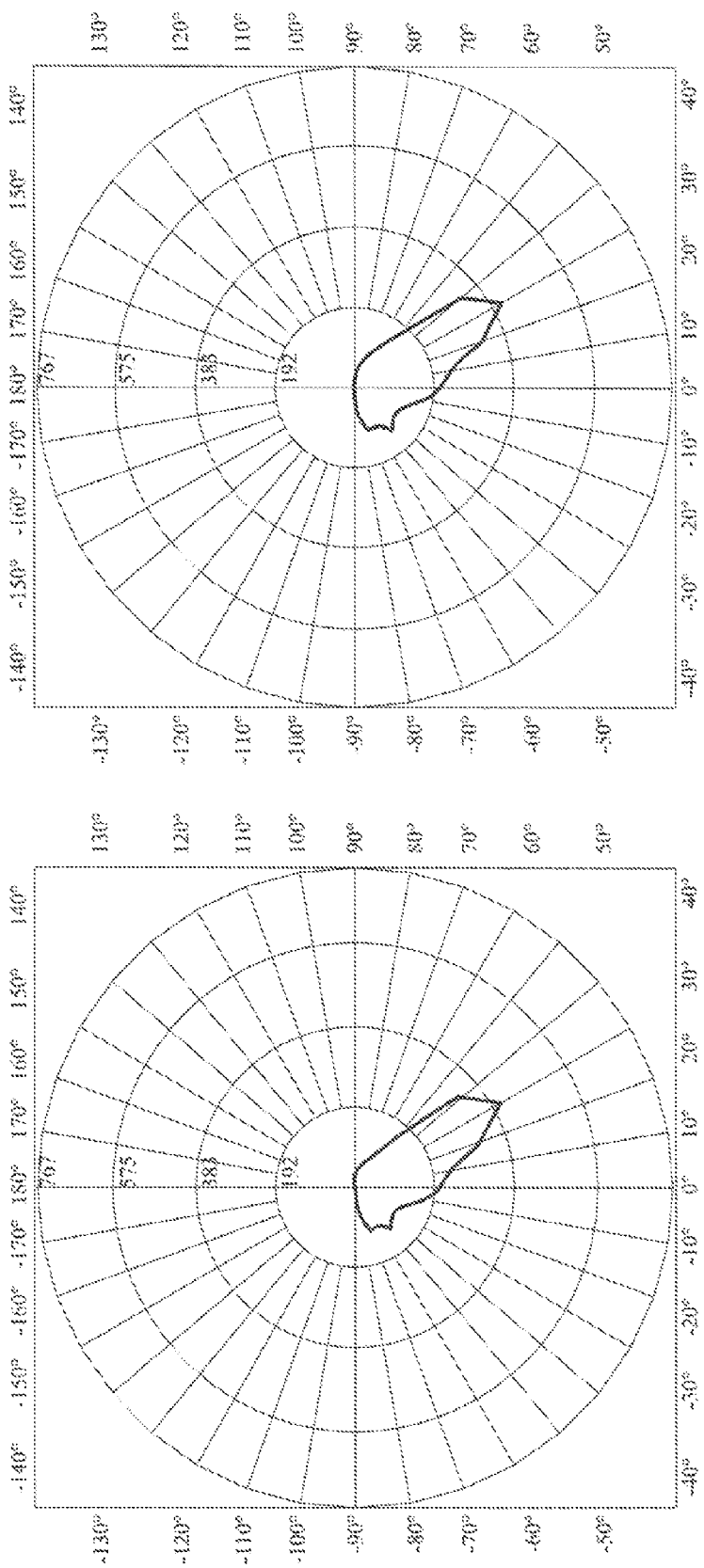

OPTICAL LENS

BACKGROUND OF THE INVENTION

1. Field of the Invention

This invention relates to optical lenses, and, more particularly, to an optical lens that is used for a light emitting diode.

2. Description of Related Art

A light emitting diode (LED) is a semiconductor component that converts a current to a certain wavelength range. An LED, due to its various advantages, such as high light intensity, low working voltage and power consumption, easy compatibility with an integrated circuit, simple driving mechanism, and long lifespan, is widely applied to an illumination field.

In recent years, illumination equipment that employs LEDs is replacing the conventional outdoor illumination equipment such as street light. However, LEDs emit light in a certain direction. Compared with the convention illumination equipment, which emits non-directional light, LEDs have significantly different light distribution. Therefore, LEDs are used as outdoor illumination equipment in a limited manner.

In order for an LED to be used effectively, a lens is designed to cover a packaged LED and calibrate the light emitted from the packaged LED, in order to achieve expected horizontal and vertical beam angles.

How to provide a lens that outputs symmetrical light and has a certain beam angle is one of the most popular development issues in the art.

SUMMARY OF THE INVENTION

In an embodiment, the present invention provides an optical lens for covering a light emitting unit, the optical lens comprising: a first lens body, including: a first light exiting surface, a second light exiting surface, a first light incident surface and a second light incident surface that oppose the first light exiting surface, a third light incident surface opposing the second light exiting surface, and a bottom surface connected to the first light incident surface, the second light incident surface and the third light incident surface, wherein the first light incident surface, the second light incident surface and the third light incident surface are sequentially connected to form on the bottom surface a groove configured to receive the light emitting unit; a second lens body connected to the first lens body, and including: an outer circumference surface connected to the second light exiting surface, and a first inner circumference surface and a second inner circumference surface that oppose the outer circumference surface, wherein the first inner circumference surface is connected to the bottom surface and the third light incident surface, and the first inner circumference surface and the second inner circumference surface are connected to each other to form a cavity; and a mounting body surrounding and connected to the first lens body and the second lens body, and extending outward with respect to the first lens body and the second lens body.

In an embodiment, the optical lens has a horizontal beam angle equal to 171.6 degrees ±10% and a vertical beam angle equal to 160 degrees ±10%.

In another embodiment, the present invention provides an optical lens for covering a light emitting unit, the optical lens comprising: a first lens body, including: a light exiting surface, a first light incident surface, a second light incident surface and a third light incident surface that oppose the first light exiting surface, and a bottom surface connected to the first light incident surface, the second light incident surface and the third light incident surface, wherein the first light incident surface, the second light incident surface and the third light incident surface are sequentially connected to form on the bottom surface a groove configured to receive the light emitting unit; a second lens body connected to the first lens body and including: an outer circumference surface connected to the light exiting surface, a first inner circumference surface and a second inner circumference surface that oppose the outer circumference surface, wherein the first inner circumference surface is connected to the bottom surface, and the first inner circumference surface and the second inner circumference surface are connected to each other to form a cavity; and a mounting body surrounding and connected to the first lens body and the second lens body, and extending outward with respect to the first lens body and the second lens body.

In an embodiment, the optical lens has a horizontal beam angle equal to 107.9 degrees ±10% and a vertical beam angle equal to 152.8 degrees ±10%.

BRIEF DESCRIPTION OF DRAWINGS

The invention can be more fully understood by reading the following detailed descriptions of the preferred embodiments, with reference made to the accompanying drawings, wherein:

FIGS. 7A-7D are light intensity distribution diagrams of an optical lens of the first embodiment according to the present invention;

DETAILED DESCRIPTION OF THE INVENTION

The following illustrative embodiments are provided to illustrate the disclosure of the present invention. These and other advantages and effects can be apparently understood by those in the art after reading the disclosure of this specification. The present invention can also be performed or applied by other different embodiments. The details of the specification may be on the basis of different points and applications, and numerous modifications and variations can be devised without departing from the spirit of the present invention.

First Embodiment

Refer to FIGS. 1-4C, which are a perspective view, a bottom view, a top view, an A-A cross-sectional view, a B-B cross-sectional view, and a schematic diagram of the curvature of an optical lens of a first embodiment according to the present invention, respectively.

In the first embodiment, the optical lens comprises a first lens body 1, a second lens body 2 and a mounting body 3.

Figure 1:
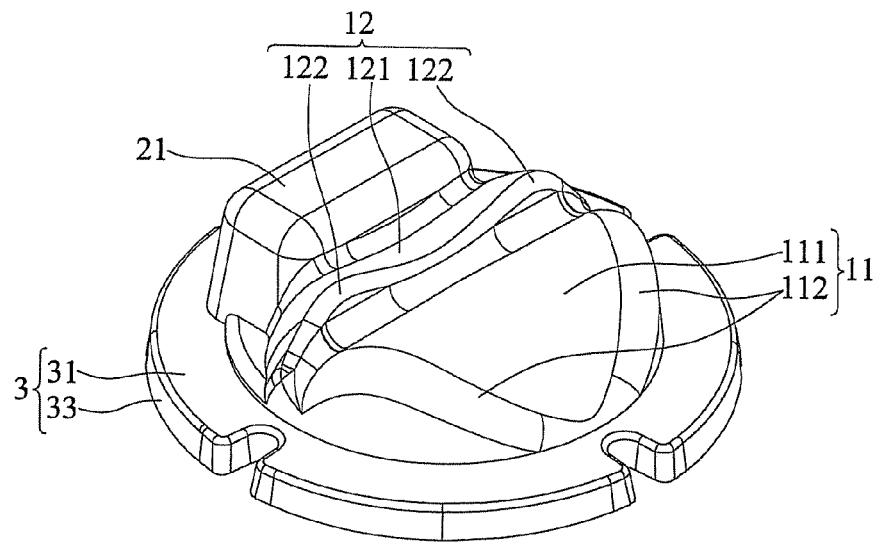
FIG. 1 is a perspective view of an optical lens of a first embodiment according to the present invention.
Figure 4A:
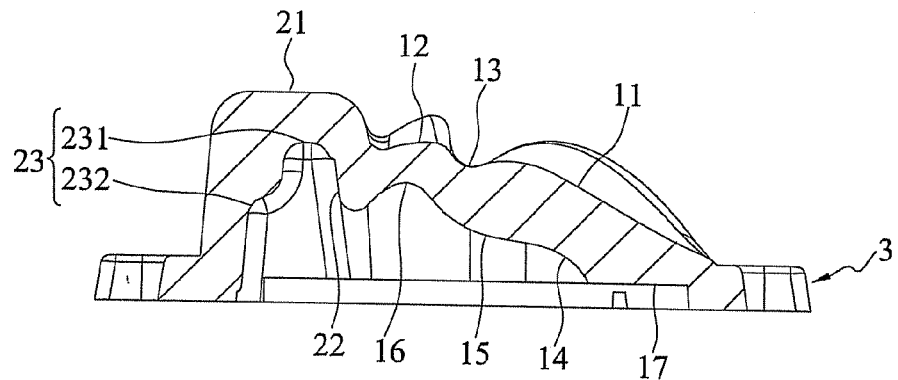
FIG. 4A is a cross-sectional view of the optical lens of the first embodiment according to the present invention along a cross-section line A-A shown in FIG. 3.
Figure 4B:
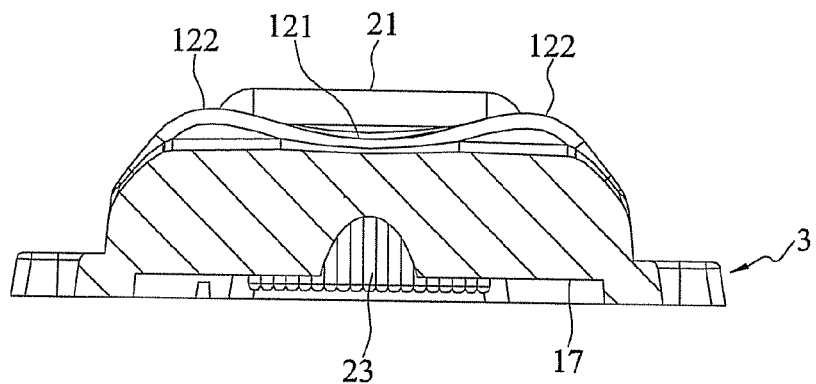
FIG. 4B is a cross-sectional view of the optical lens of the first embodiment according to the present invention along a cross-section line B-B shown in FIG. 3.
Figure 4C:
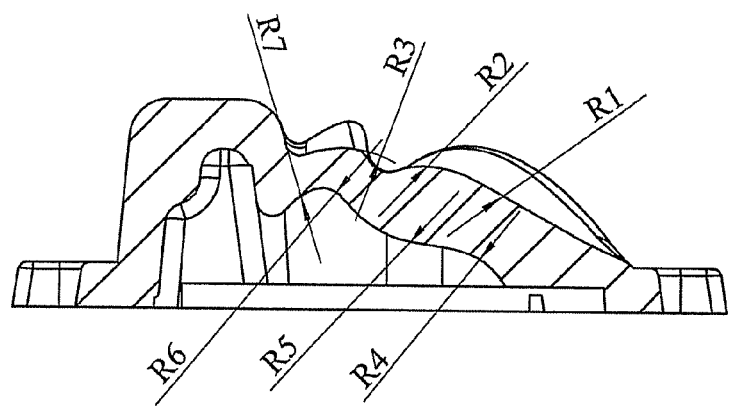
FIG. 4C is a schematic view of the curvatures of the optical lens of the first embodiment according to the present invention.

The first lens body 1 comprises a first light exiting surface 11, a second light exiting surface 12, a buffer surface 13 connected to the first light exiting surface 11 and the second light exiting surface 12, a first light incident surface 14 and a second light incident surface 15 opposing the first light exiting surface 11, a third light incident surface 16 opposing the second light exiting surface 12, and a bottom surface 17 connected to the first light incident surface 14, the second light incident surface 15 and the third light incident surface 16. The first light incident surface 14, the second light incident surface 15 and the third light incident surface 16 are sequentially connected to form on the bottom surface 17 a groove 10 for receiving a light emitting unit (not shown, e.g., an LED). The groove 10 is disposed in the center of the optical lens, and can receive an LED that is 10.5 mm to 25 mm in size. The depth of the groove 10 decreases gradually in a direction away from the second lens body 2. As shown in FIGS. 1, 4A and 4B, the first light exiting surface 11 is in a wave shape that rises at two side regions 112 and sinks at a central region 111, and the second light exiting surface 12 is also in a wave shape that rises at two side regions 122 and sinks at a central region 121. As a whole, the first light exiting surface 11, the second light exiting surface 12, the buffer surface 13 and the bottom surface 17 constitute a convex lens that has a thickness that decreases gradually in a direction away from the second lens body 2.

The first light exiting surface 11 has a curvature R1 and a curvature R2. The second light exiting surface 12 has a curvature R3. The first light incident surface 14 has a curvature R4. The second light incident surface 15 has a curvature R5. The third light incident surface 16 has curvatures R6 and R7. R1>R3>R2, and R5>R4>R7>R6. In an embodiment, the curvature R1 is about 93.2 mm ±2%; the curvature R2 is about 10.6 mm ±%; the curvature R3 is about 13.3 mm ±2%; the curvature R4 is about 8.4 mm ±2%; the curvature R5 is about 20.4 mm ±2%; the curvature R6 is about 3.2 mm ±2%; and the curvature R7 is about 7.6 mm ±2%.

Figure 2:
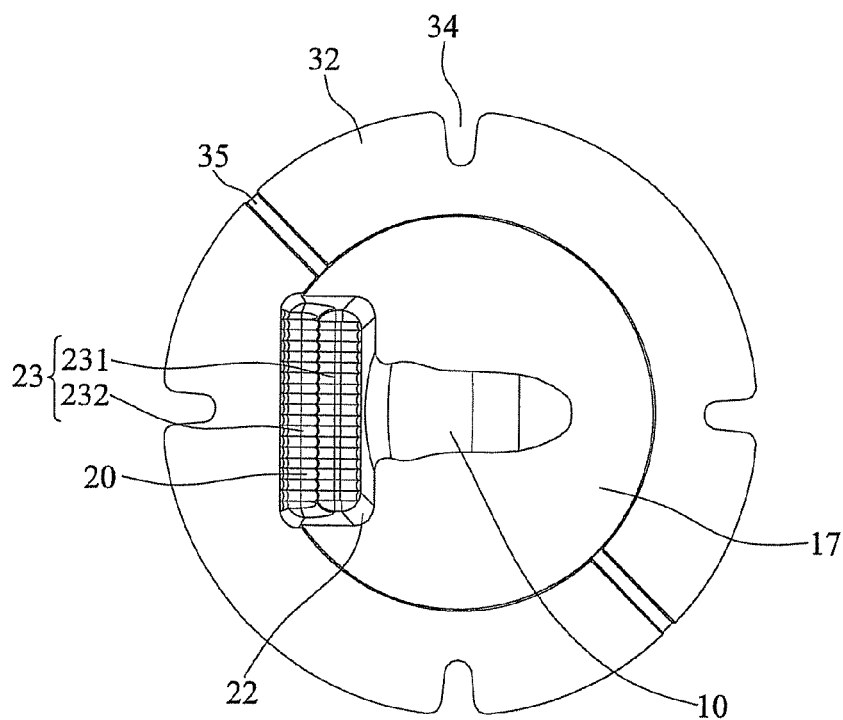
FIG. 2 is a bottom view of the optical lens of the first embodiment according to the present invention.
Figure 3:
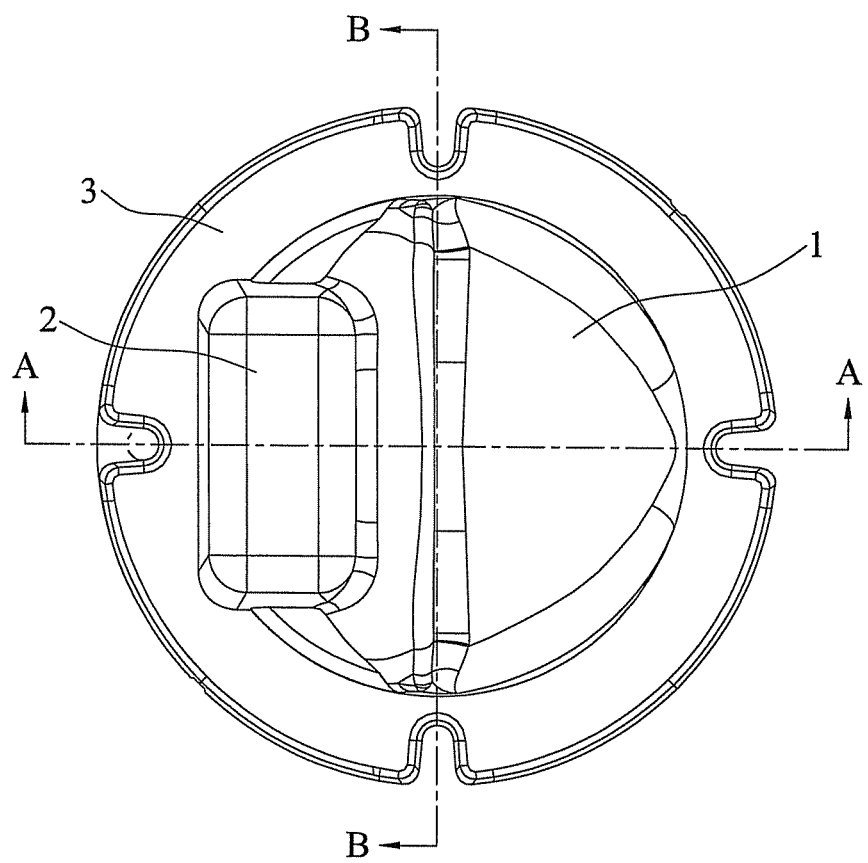
FIG. 3 is a top view of the optical lens of the first embodiment according to the present invention.

The second lens body 2 comprises an outer circumference surface 21 connected to the second light exiting surface 12, a first inner circumference surface 22 opposing the outer circumference surface 21 and connected to the third light incident surface 16 and the bottom surface 17, and an uneven second inner circumference surface 23 opposing the outer circumference surface 21. The first inner circumference surface 22 and the second inner circumference surface 23 are connected to each other to form a cavity 20. The cavity 20 has a depth that decreases gradually in a direction away from the first lens body 1. In an embodiment, the second inner circumference surface 23 has a plurality of continuous glass semi-cylinders (represented by grids as shown in FIG. 2) formed thereon such that the second inner circumference surface 23 is uneven. In an embodiment, the second lens body 2 is in a cuboid shape having an opening on one surface thereof, with the remaining five surfaces constituting the outer circumference surface 21. The cavity 20 is also in a cuboid shape having an opening. In the five remaining surfaces of the cuboid shape, a surface 231 acts as a bottom part of the cavity 20; a surface 232 opposing the first lens body 1 acts as the second inner circumference surface 23; and the remaining three surfaces constitute the first inner circumference surface 22.

The mounting body 3 surrounds and is connected to the first lens body 1 and the second lens body 2, and has a first surface 31 connected to the first light exiting surface 11, the second light exiting surface 12 and the outer circumference surface 21, a second surface 32 opposing the first surface 31 and connected to the bottom surface 17 and the second inner circumference surface 23, a lateral surface 33 connected to the first surface 31 and the second surface 32, a mounting hole 34 formed on the lateral surface 33 for a screw to pass therethrough, and a wire slot 35 formed on the second surface 32 for a wire of an LED to pass. The mounting body 3 extends outward with respect to the first lens body 1 and the second lens body 2 that are connected.

The height of the second lens body 2 with respect to the mounting body 3 is greater than the thickness of the first lens body 1, and the depth of the cavity 20 is greater than the depth of the groove 10.

Figure 5:
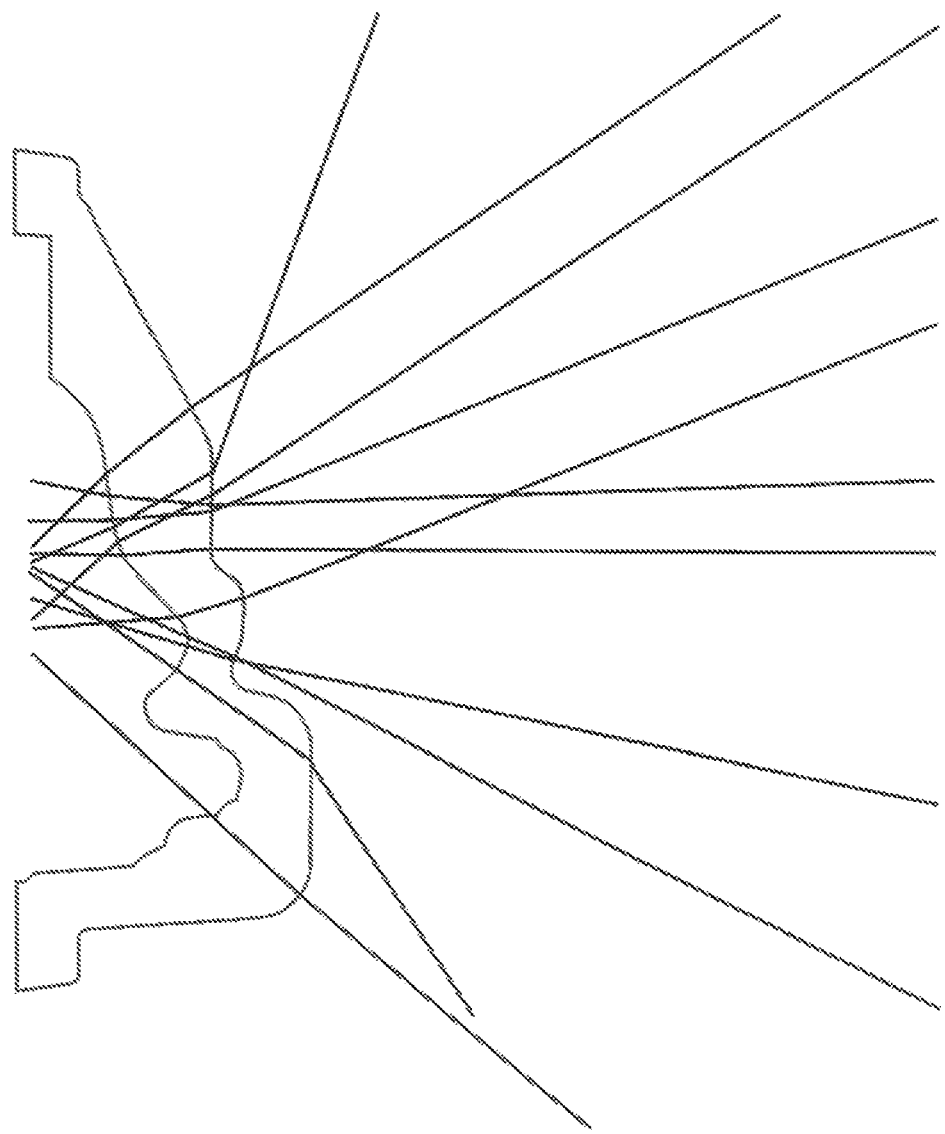
FIG. 5 is a light path diagram of the optical lens of the first embodiment according to the present invention.

FIG. 5 shows a light path of the optical lens of the first embodiment. An LED (not shown) is received in the groove 10. The majority of the light emitted by the LED passes through the first light incident surface 14, the second light incident surface 15 and the third light incident surface 16, enters the first lens body 1, passes through the first light exiting surface 11, the second light exiting surface 12 and the buffer surface 13, and leaves from the first lens body 1. The light is refracted when entering and leaving the first lens body 1, and exits from the first lens body 1 in a direction away from the second lens body 2. The majority of the light emitted by the optical lens of the first embodiment leaves from the first lens body 1, and the minority of the light enters through the first lens body 1 into the second lens body 2. The remaining light that does not enter the first lens body 1 enters the second lens body 2 directly. The outer circumference surface 21, the first inner circumference surface 22 and the second inner circumference surface 23 of the second lens body 2 are designed to have specific curvatures, such that the light entering the second lens body 2 is totally reflected, and is guided into and leaves from the mounting body 3, without affecting the light left from the first lens body 1. The uneven portion on the second inner circumference surface 23 of the second lens body 2 does not reflect the light projected thereunto, and the light will pass through the second lens body 2 directly. In other words, the second lens body 2 scatters the light that does not enter the first lens body 1, which thus does not affect the light emitted from the first lens body 1.

Figure 6:
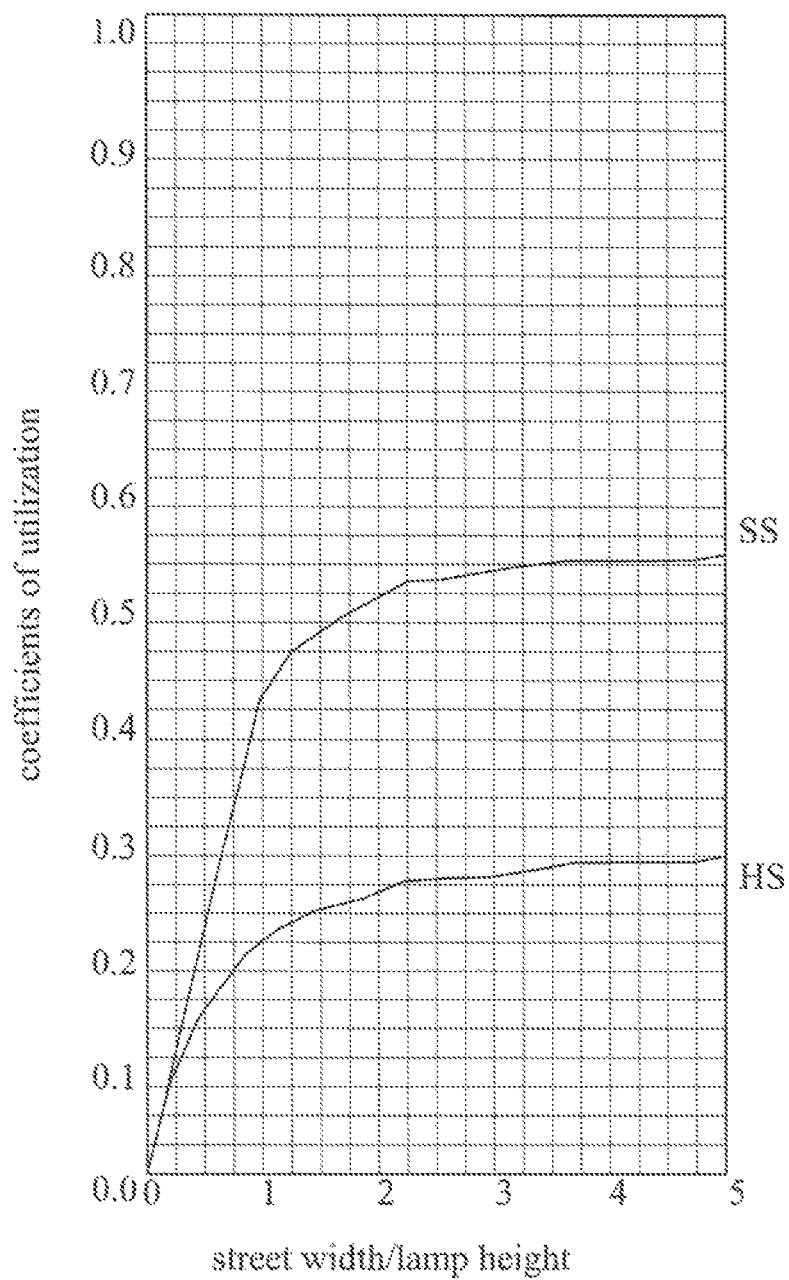
FIG. 6 is a flux distribution diagram of the optical lens of the first embodiment according to the present invention.

FIG. 6 is a flux distribution diagram of the optical lens of the first embodiment. In an embodiment, the optical lens covers an LED that is embodied as a street lamp. The transverse axis represents a ratio of the width of a street where the street lamp is located and the height of the street lamp, while the vertical axis represents coefficients of utilization, which are ratios of the flux of light projected onto a working surface and the total flux of the light emitted by the street lamp. FIG. 6 shows that a house side (HS) line has a flux ratio less than a flux ratio of a street side (SS) line, which indicates that the majority of the light is projected onto the street. Therefore, it is known from FIGS. 5 and 6 that the optical lens according to the present invention projects light on the street side via the first lens body 1, and the second lens body 2 can scatter the light and prevent the light from being projected onto the house side.

Figure 7D:
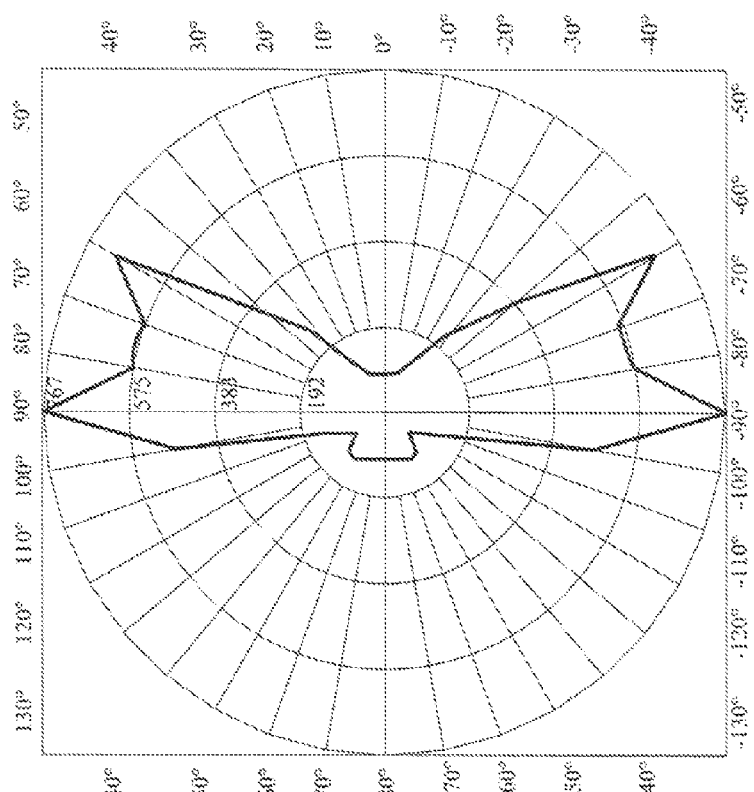
Figure 7C:
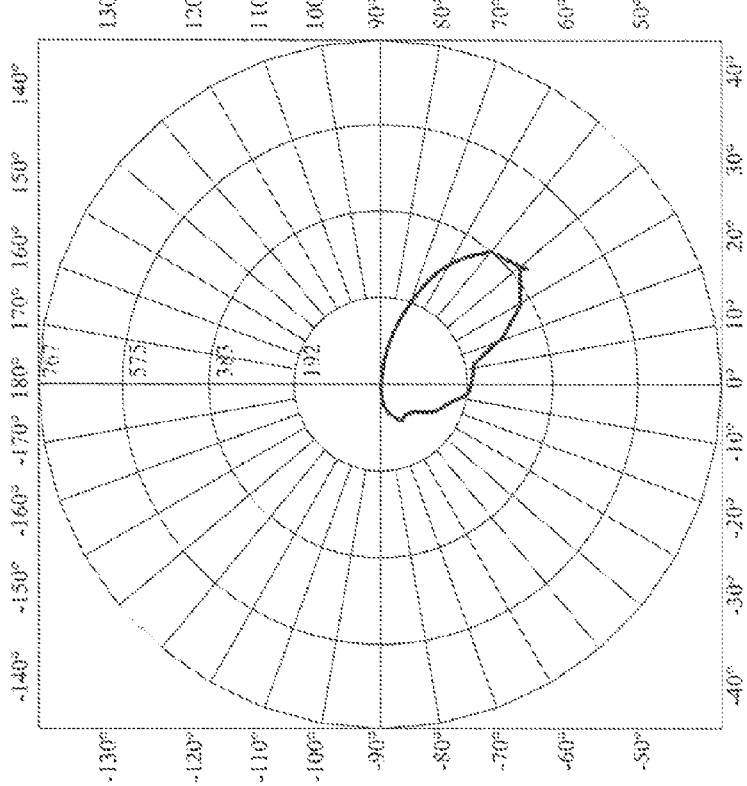
Figure 8:
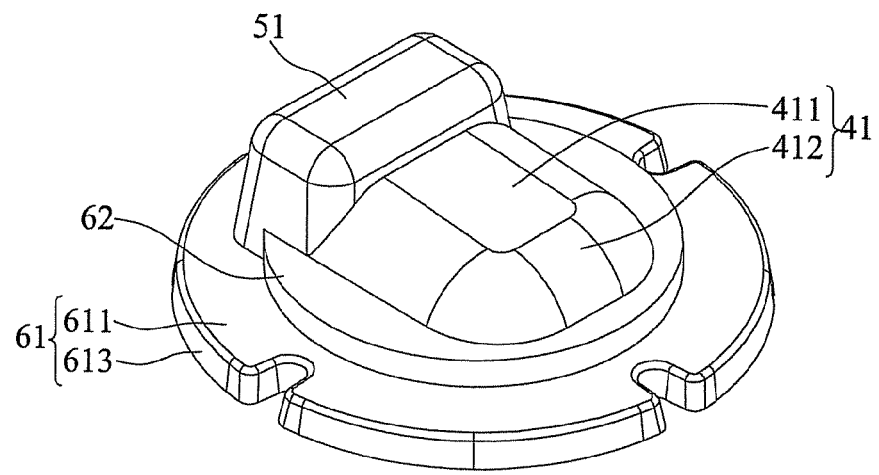
FIG. 8 is a perspective view of an optical lens of a second embodiment according to the present invention.

FIGS. 7A and 7B show the intensity distribution of the light on two vertical planes through horizontal angles 0°-180° and 180°-0°, respectively. In contrast to FIG. 3, the light axis of the optical lens projects out of the surface of the diagram vertically, and the vertical planes through horizontal angles 0°-180° and 180°-0°, respectively, are surfaces cutting the A-A cross-sectional line. It is known from FIGS. 3, 7A and 7B that the majority of the light intensity of the optical lens of the first embodiment is distributed at a location offset from the light axis by 30 degrees, i.e., in a direction toward the first lens body 1. In contrast to FIG. 3, a location where the right end of the A-A cross-sectional line passes through the first lens body 1 is referred to as a horizontal angle 180 degrees, and FIG. 7C shows the intensity distribution diagram of the light passing the vertical plane through horizontal angles 45°-225°. Refer to FIG. 7D, which shows the intensity distribution diagram of the light passing a horizontal cone through vertical angle 60 degrees. The cone formed by the light emitted from the optical lens has a maximum candle light 767 cd at a location where the vertical angle is 60 degrees and the horizontal angle is 90 degrees. FIG. 7D also shows that in the first embodiment, the majority of the light is emitted from the first lens body 1, especially from the two side regions 112 and 122 of the first lens body 1.

FIGS. 1-7D show the basic structure and the emitted and grading light of the optical lens of the first embodiment according to the present invention. It is known from the above that the optical lens of the first embodiment has a horizontal beam angle equal to 171.6 degrees±10% and a vertical beam angle equal to 160 degrees±10%.

Second Embodiment

Refer to FIGS. 8-11C, which are a perspective view, a bottom view, a top view, an A-A cross-sectional view, a B-B cross-sectional view, and a schematic diagram of the curvature of an optical lens of a second embodiment according to the present invention, respectively.

In the second embodiment, the optical lens comprises a first lens body 4, a second lens body 5 and a mounting body 6.

Figure 9:
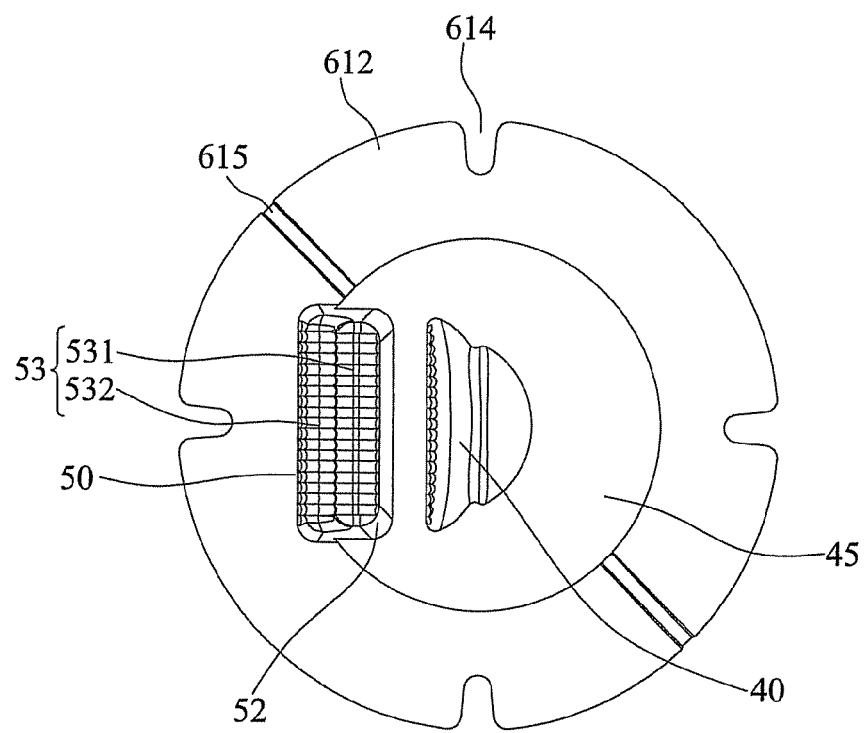
FIG. 9 is a bottom view of the optical lens of the second embodiment according to the present invention.
Figure 10:
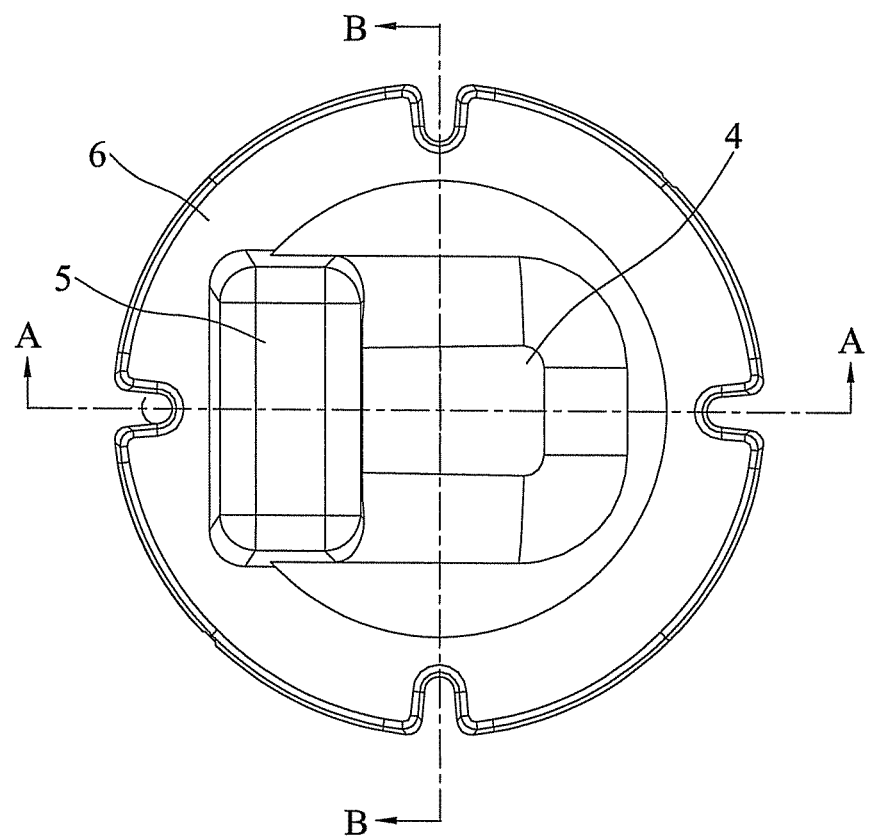
FIG. 10 is a top view of the optical lens of the second embodiment according to the present invention.
Figure 11A:
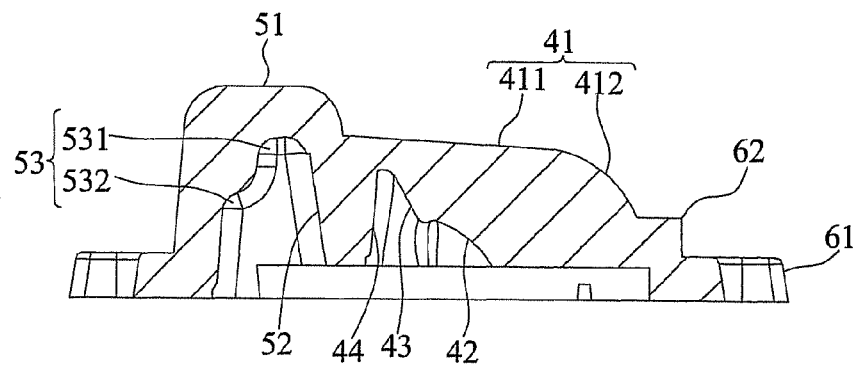
FIG. 11A is a cross-sectional view of the optical lens of the second embodiment according to the present invention along a cross-section line A-A shown in FIG. 10.
Figure 11B:
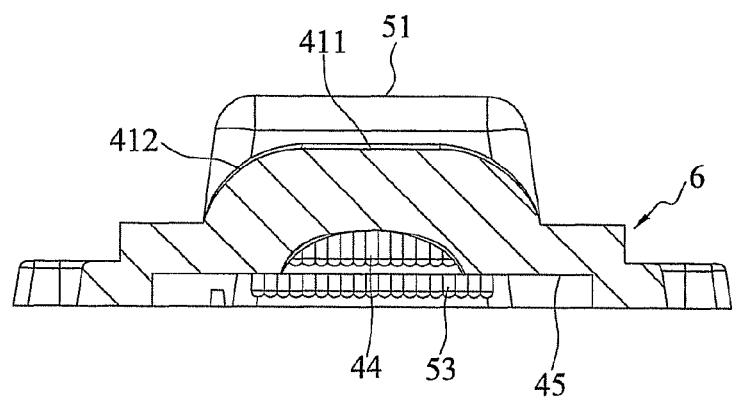
FIG. 11B is a cross-sectional view of the optical lens of the second embodiment according to the present invention along a cross-section line B-B shown in FIG. 10.
Figure 11C:
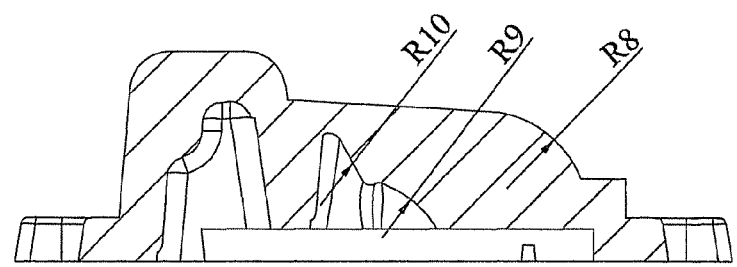
FIG. 11C is a schematic view of the curvatures of the optical lens of the second embodiment according to the present invention.

The first lens body 4 comprises a light exiting surface 41, a first light incident surface 42, a second light incident surface 43 and an uneven third light incident surface 44 that oppose the light exiting surface 41, and a bottom surface 45 connected to the first light incident surface 42, the second light incident surface 43 and the third light incident surface 44. The first light incident surface 42, the second light incident surface 43 and the third light incident surface 44 are sequentially connected to form on the bottom surface 45 a groove 40 for receiving a light emitting unit (not show, e.g., an LED). The groove 40 is located in the center of the optical lens, and can receive an LED that is 10.5 mm to 25 mm in size. The depth of the groove 40 decreases gradually in a direction away from the second lens body 5. In an embodiment, the third light incident surface 44 has a plurality of glass semi-cylinders (represented by grids as shown in FIG. 9) formed thereon such that the third light incident surface 44 is uneven. The light exiting surface 41 comprises a planer surface region 411 and cambered surface region 412 surrounding the planer surface region 411 and connected to the mounting body 3. As a whole, the light exiting surface 41 and the bottom surface 45 constitute a convex lens having a thickness that decreases gradually in a direction away from the second lens body 5.

The cambered surface of the light exiting surface 41 has a curvature R8. The first light incident surface 42 has a curvature R9. The second light incident surface 43 has a curvature R10. R10>R9. In an embodiment, the curvature R8 is about 16.4 mm±2%, the curvature R9 is about 16.41 mm±2%, and the curvature R10 is about 306.35 mm±2%.

The second lens body 5 comprises an outer circumference surface 51 connected to the light exiting surface 41 and a first inner circumference surface 52 and an uneven second inner circumference surface 53 opposing the outer circumference surface 51. The first inner circumference surface 52 and the second inner circumference surface 53 are connected to each other to form a cavity 50. The depth of the cavity 50 decrease gradually in a direction away from the first lens body 4. In an embodiment, the second inner circumference surface 53 has a plurality of glass semi-cylinders (represented by grids as shown in FIG. 9) formed thereon such that the second inner circumference surface 53 is uneven. As a whole, the second lens body 5 is in a cuboid shape having an opening on one surface thereof, with the remaining five surfaces constituting the outer circumference surface 51. The cavity 50 is also in a cuboid shape having an opening. In the five remaining surfaces of the cuboid shape, a surface 531 acts as a bottom part of the cavity 50; a surface 532 opposing the first lens body 4 acts as the second inner circumference surface 53; and the remaining three surfaces constitute the first inner circumference surface 52.

The mounting body 6 surrounds and is connected to the first lens body 4 and the second lens body 5, and comprises a mounting part 61 and a connecting part 62 connected to the mounting part 61, the first lens body 4 and the second lens body 5. The mounting part 61 comprises a first surface 611 connected to the second lens body 5 and the connecting part 62, a second surface 612 opposing the first surface 611 and connected to the bottom surface 45 and the second inner circumference surface 53, a lateral surface 613 connected to the first surface 611 and the second surface 612, a mounting hole 614 formed on the lateral surface 613 for a screw to pass therethrough, and a wire slot 615 formed on the second surface for a wire of an LED to pass. The mounting body 6 extends outward with respect to the first lens body 4 and the second lens body 5 that are connected.

The height of the second lens body 5 with respect to the mounting body 6 is greater than the thickness of the first lens body 4, and the depth of the cavity 50 is greater than the depth of the groove 40.

Figure 12:
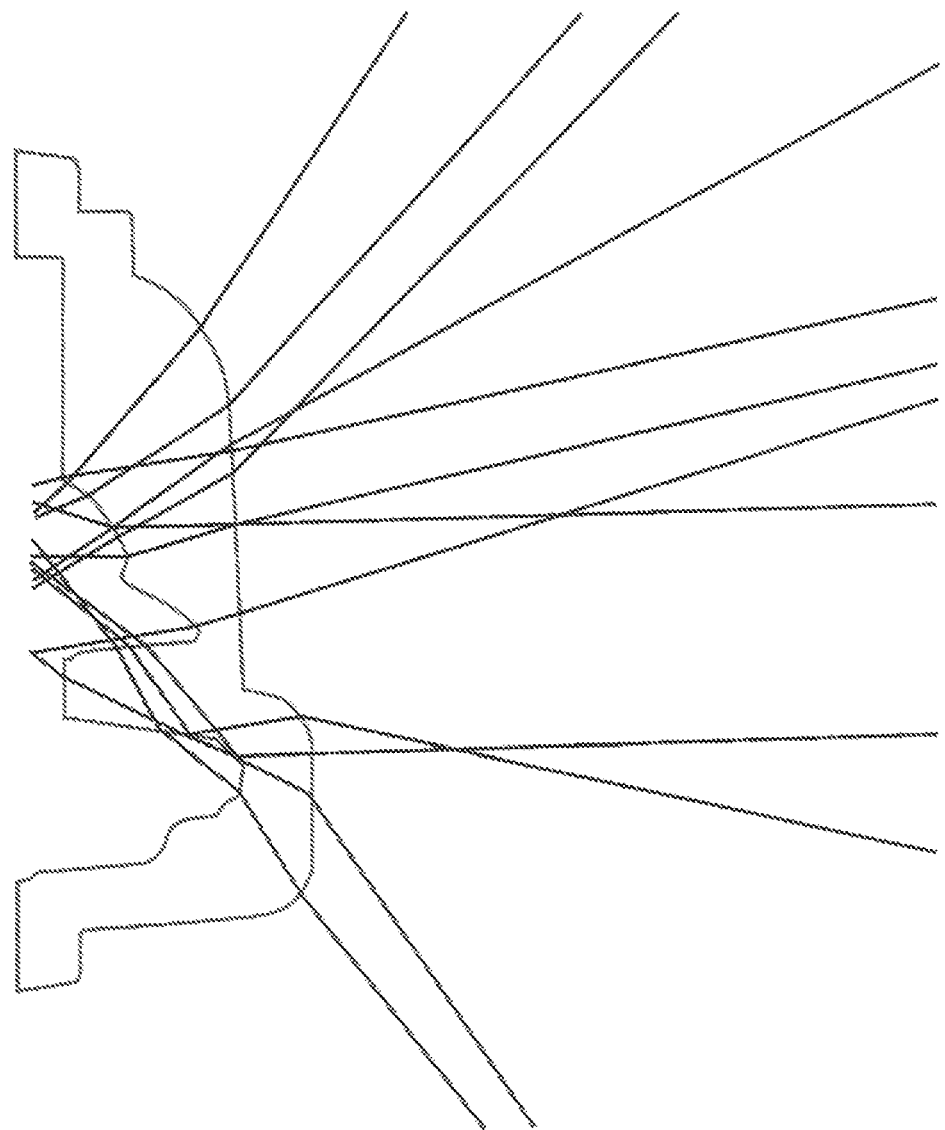
FIG. 12 is a light path diagram of the optical lens of the second embodiment according to the present invention.

FIG. 12 shows a light path of the optical lens of the first embodiment. An LED (not shown) is received in the groove 40. The majority of the light emitted by the LED passes through the first light incident surface 42 and the second light incident surface 43, enters the first lens body 4, passes through the light exiting surface 41, and leaves from the first lens body 4. The light is refracted when entering and leaving the first lens body 4, and exits from the first lens body 4 in a direction away from the second lens body 5. The majority of the light emitted by the optical lens of the second embodiment leaves from the first lens body 4, and the minority of the light enters through the third light incident surface 44 of the first lens body 4 into the second lens body 5. The uneven portion of the third light incident surface 44 does not reflect the light projected thereonto, and the light will pass the second lens body 5 directly. The outer circumference surface 51, the first inner circumference surface 52 and the second inner circumference surface 53 of the second lens body 5 are designed to have specific curvatures, and the light entering the second lens body 5 will be totally reflected in the second lens body 5, be guided into the mounting body 6, and leave from the mounting body 6, which thus does not affect the light emitted from the first lens body 4. In addition, the uneven portion on the second inner circumference surface 53 of the second lens body 5 does not reflect the light projected thereunto, and the light will pass through the second lens body 5 directly. In other words, the second lens body 5 scatters the light that does not enter the first lens body 1, which thus does not affect the light emitted from the first lens body 5.

Figure 13:
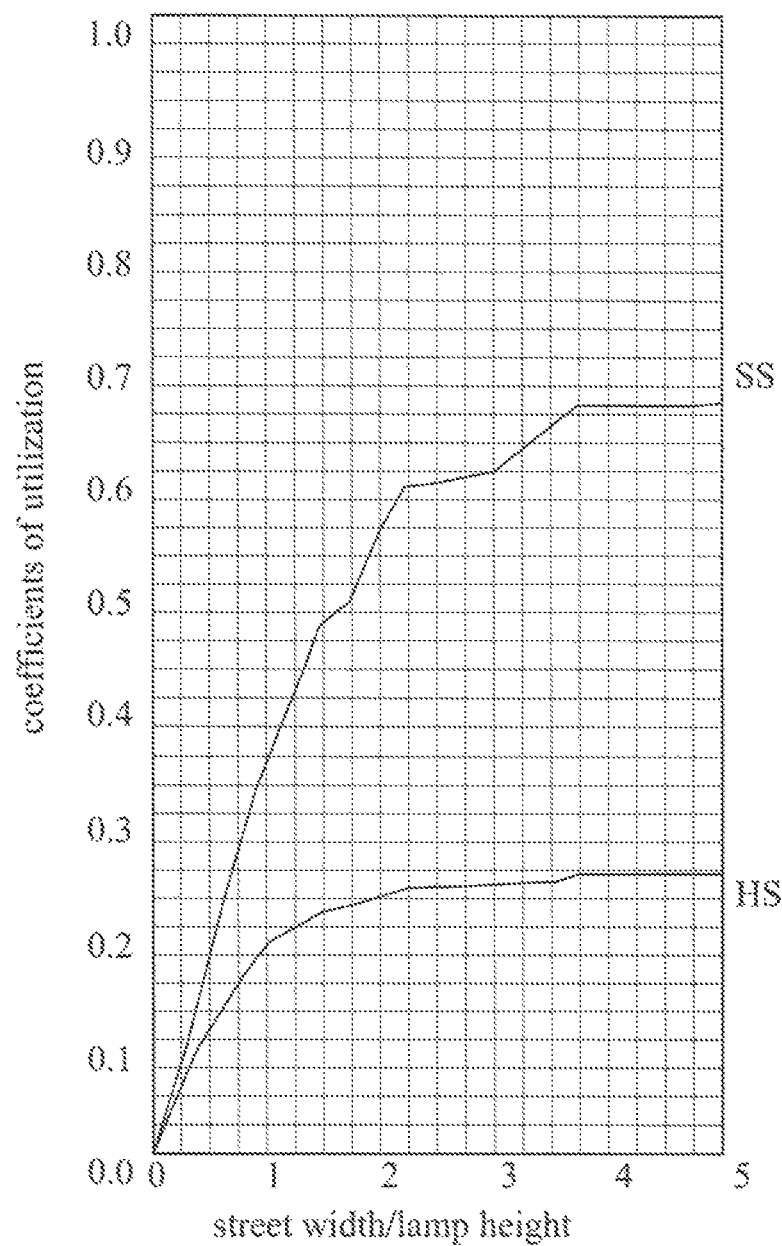
FIG. 13 is a flux distribution diagram of the optical lens of the second embodiment according to the present invention.

FIG. 13 is a flux distribution diagram of the optical lens of the second embodiment. In an embodiment, the optical lens covers an LED that is embodied as a street lamp. The transverse axis represents a ratio of the thickness of a street where the street lamp is located and the height of the street lamp, while the vertical axis represents coefficients of utilization, which are ratios of the flux of the light projected onto a working surface and the total flux of the light emitting by the street lamp. FIG. 13 shows that a house side (HS) line has a flux ratio less than a flux ratio of a street side (SS) line, which indicates that the majority of the light is projected onto the street. Therefore, it is known from FIGS. 12 and 13 that the optical lens according to the present invention projects light on the street side via the first lens body 1, and the second lens body 2 can scatter the light and prevent the light from being projected onto the house side.

Figure 14A:
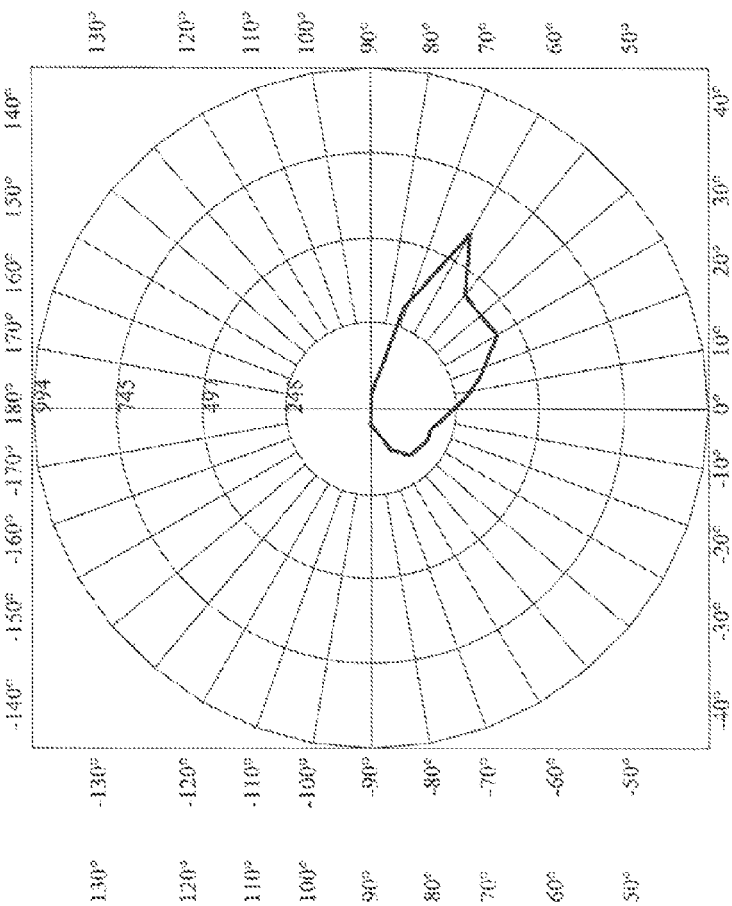
FIGS. 14A-14D are light intensity distribution diagrams of an optical lens of the second embodiment according to the present invention.
Figure 14B:
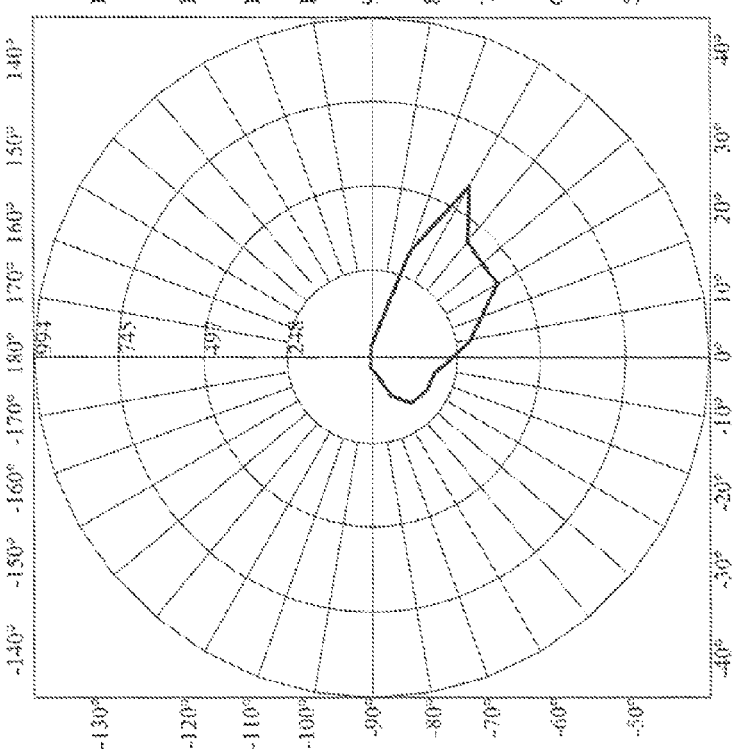
Figure 14D:
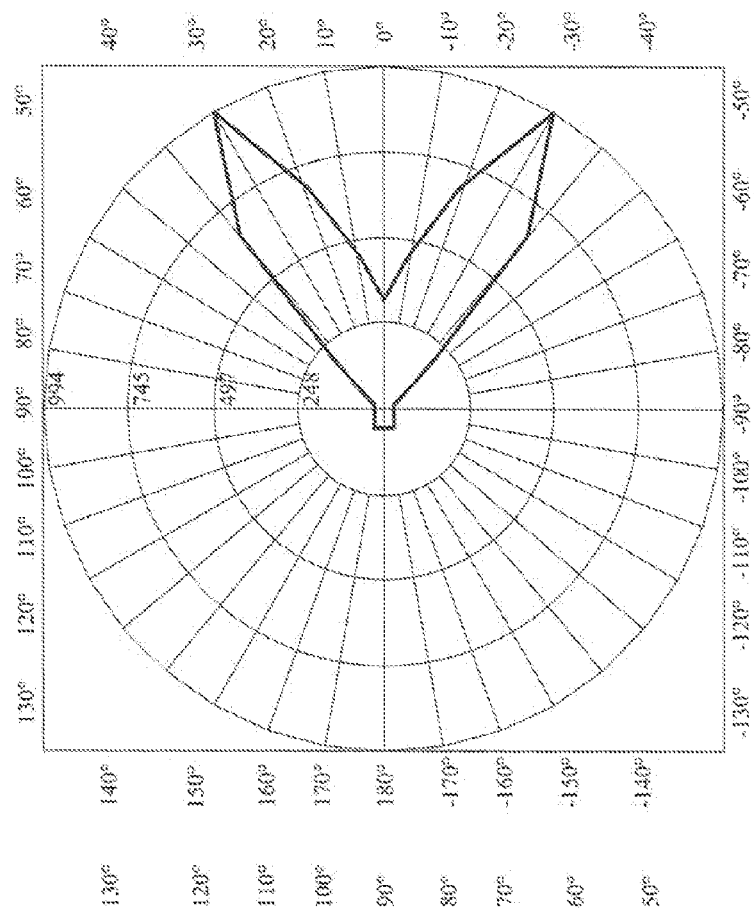
Figure 14C:
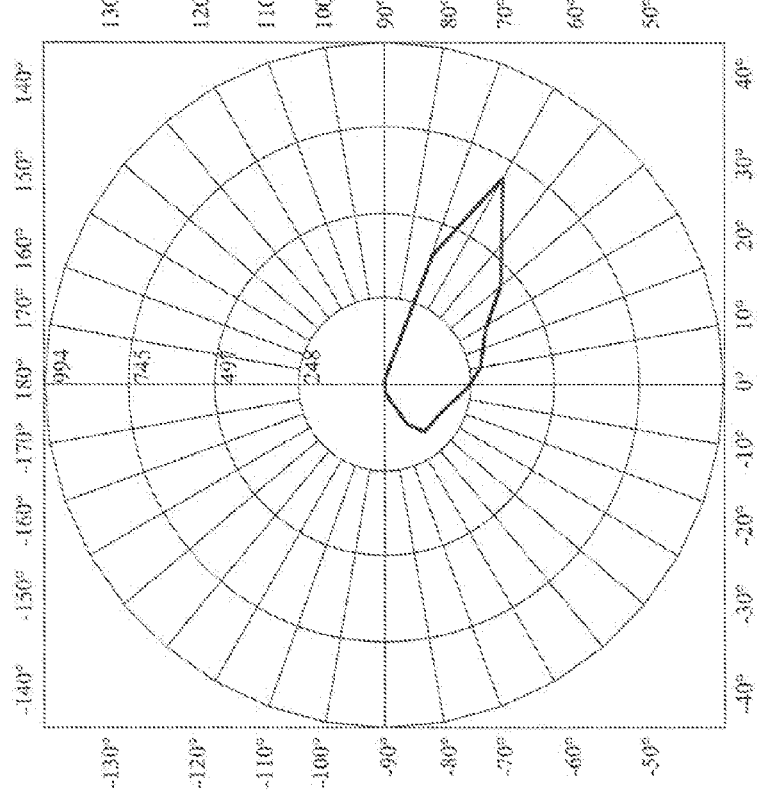

FIGS. 14A and 14B show the intensity distribution of light on two vertical planes through horizontal angles 0°-180° and 180°-0°, respectively. In contrast to FIG. 10, the light axis of the optical lens projects out of the surface of the diagram vertically, and the vertical planes through horizontal angles 0°-180° and 180°-0°, respectively, are surfaces cutting the A-A cross-sectional line. It is known from FIGS. 10, 14A and 14B that the majority of the light intensity of the optical lens of the first embodiment is distributed at a location offset from the light axis by 60 degrees, i.e., in a direction toward the first lens body 1. In contrast to FIG. 10, a location where the right end of the A-A cross-sectional line passes through the first lens body 4 is referred to as a horizontal angle 0 degree; a location where the left end of the A-A cross-sectional line passes through the second lens body 5 is referred to as a horizontal angle 180 degrees; and FIG. 14C shows the intensity distribution diagram of the light passing the vertical plane through horizontal angles 45°-225°. Refer to FIG. 14D, which shows the intensity distribution diagram of the light passing a horizontal cone through vertical angle 70 degrees. The cone formed by the light emitted from the optical lens has a maximum candle light 994 cd at a location where the vertical angle is 70 degrees and the horizontal angle is 30 degrees. FIG. 14D also shows that in the second embodiment, the majority of the light is emitted from the first lens body 4, especially from the cambered surface 412 of the first lens body 4.

FIGS. 8-14D show the basic structure and the emitted and grading light of the optical lens of the second embodiment according to the present invention. It is known from the above that the optical lens of the second embodiment has a horizontal beam angle equal to 107.9 degrees ±10% and a vertical beam angle equal to 152.8 degrees ±10%.

In sum, the optical lens according to the present invention scatters the light ready to be projected onto the house side and projects the light onto the street side, and the light projected onto the street side is focused on the two sides of the street more than the central region. Therefore, a greater horizontal beam angle is obtained.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. An optical lens for covering a light emitting unit, the optical lens comprising:
   a first lens body, including:
      a first light exiting surface;
      a second light exiting surface;
      a first light incident surface and a second light incident surface that oppose the first light exiting surface;
      a third light incident surface opposing the second light exiting surface; and
      a bottom surface connected to the first light incident surface, the second light incident surface and the third light incident surface;
      wherein the first light incident surface, the second light incident surface and the third light incident surface are sequentially connected to form on the bottom surface a groove configured to receive the light emitting unit;
   a second lens body connected to the first lens body, and including:
      an outer circumference surface connected to the second light exiting surface; and
      a first inner circumference surface and a second inner circumference surface that oppose the outer circumference surface;
      wherein the first inner circumference surface is connected to the bottom surface and the third light incident surface, and wherein the first inner circumference surface and the second inner circumference surface are connected to each other to form a cavity; and
   a mounting body surrounding and connected to the first lens body and the second lens body, and extending outward with respect to the first lens body and the second lens body.

2. The optical lens of claim 1, wherein the first light exiting surface has a first curvature and a second curvature, the second light exiting surface has a third curvature less than the first curvature and greater than the second curvature, the first light incident surface has a fourth curvature, the second light incident surface has a fifth curvature greater than the fourth curvature, the third light incident surface has a sixth curvature and a seventh curvature, and the seventh curvature is greater than the sixth curvature and less than the fourth curvature.

3. The optical lens of claim 1 having a horizontal beam angle equal to 171.6 degrees ±10% and a vertical beam angle equal to 160 degrees ±10%.

4. The optical lens of claim 1, wherein the first light exiting surface is in a wave shape rising at two side regions of the first light exiting surface and sinking at a central region of the first light exiting surface.

5. The optical lens of claim 1, wherein the second light exiting surface is in a wave shape rising at two side regions of the second light exiting surface and sinking at a central region of the second light exiting surface.

6. The optical lens of claim 1, wherein a height of the second lens body with respect to the mounting body is greater than a thickness of the first lens body, the thickness of the first lens body decreases gradually in a direction away from the second lens body, the cavity has a depth greater than a depth of the groove, the depth of the cavity decreases gradually in a direction away from the first lens body, and the depth of the groove decreases gradually in a direction away from the second lens body.

7. The optical lens of claim 1, wherein the mounting body includes:
a first surface connected to the first light exiting surface, the second light exiting surface and the outer circumference surface;
a second surface connected to the bottom surface and the second inner circumference surface;
a lateral surface connected to the first surface and the second surface;
a mounting hole formed on the lateral surface; and
a wire slot formed on the second surface.

8. The optical lens of claim 1 being made of glass.

9. The optical lens of claim 1, wherein the second inner circumference surface is an uneven surface with a plurality of glass semi-cylinders formed thereon.

10. An optical lens for covering a light emitting unit, the optical lens comprising:
a first lens body, including:
a light exiting surface;
a first light incident surface, a second light incident surface, and a third light incident surface that oppose the light exiting surface; and
a bottom surface connected to the first light incident surface, the second light incident surface and the third light incident surface;
wherein the first light incident surface, the second light incident surface and the third light incident surface are sequentially connected to form on the bottom surface a groove configured to receive the light emitting unit;
a second lens body connected to the first lens body, and including:
an outer circumference surface connected to the light exiting surface; and
a first inner circumference surface and a second inner circumference surface that oppose the outer circumference surface;
wherein the first inner circumference surface is connected to the bottom surface;
and the first inner circumference surface and the second inner circumference surface are connected to each other to form a cavity; and
a mounting body surrounding and connected to the first lens body and the second lens body, and extending outward with respect to the first lens body and the second lens body.

11. The optical lens of claim 10, wherein the light exiting surface has an eighth curvature, the first light incident surface has a ninth curvature, and the second light incident surface has a tenth curvature greater than the ninth curvature.

12. The optical lens of claim 10 having has a horizontal beam angle equal to 107.9 degrees ±10% and a vertical beam angle equal to 152.8 degrees ±10%.

13. The optical lens of claim 10, wherein a height of the second lens body with respect to the mounting body is greater than a thickness of the first lens body, the thickness of the first lens body decreases gradually in a direction away from the second lens body, the cavity has a depth greater than a depth of the groove, the depth of the cavity decreases gradually in a direction away from the first lens body, and the depth of the groove decreases gradually in a direction away from the second lens body.

14. The optical lens of claim 10, wherein the mounting body has a mounting part and a connecting part, and wherein the connecting part is connected to the mounting part, the first lens body and the second lens body.

15. The optical lens of claim 14, wherein the mounting part includes:
a first surface connected to the connecting part and the outer circumference surface;
a second surface connected to the bottom surface and the second inner circumference surface;
a lateral surface connected to the first surface and the second surface;
a mounting hole formed on the lateral surface; and
a wire slot formed on the second surface.

16. The optical lens of claim 10 being made of glass.

17. The optical lens of claim 10, wherein the third light incident surface is an uneven surface with a plurality of glass semi-cylinders formed thereon.

18. The optical lens of claim 10, wherein the second inner circumference surface is an uneven surface with a plurality of glass semi-cylinders formed thereon.

* * * * *